(12) United States Patent
Uehara et al.

(10) Patent No.: US 12,546,726 B2
(45) Date of Patent: Feb. 10, 2026

(54) INSPECTION APPARATUS AND INSPECTION METHOD FOR SEMICONDUCTOR SUBSTRATE

(71) Applicant: DENSO CORPORATION, Kariya (JP)

(72) Inventors: Junichi Uehara, Kariya (JP); Koji Eguchi, Kariya (JP)

(73) Assignee: DENSO CORPORATION, Kariya (JP)

( * ) Notice: Subject to any disclaimer, the term of this patent is extended or adjusted under 35 U.S.C. 154(b) by 233 days.

(21) Appl. No.: 18/329,792

(22) Filed: Jun. 6, 2023

(65) Prior Publication Data

US 2023/0314342 A1 Oct. 5, 2023

Related U.S. Application Data

(63) Continuation of application No. PCT/JP2021/046050, filed on Dec. 14, 2021.

(30) Foreign Application Priority Data

Jan. 13, 2021 (JP) .................. 2021-003631

(51) Int. Cl.
  *G01N 21/95* (2006.01)
  *G01N 21/84* (2006.01)
  *H01L 21/66* (2006.01)

(52) U.S. Cl.
  CPC ..... *G01N 21/9501* (2013.01); *G01N 21/9505* (2013.01); *H01L 22/00* (2013.01); *G01N 2021/8477* (2013.01)

(58) Field of Classification Search
  CPC ....... G01N 21/9501; G01N 2021/8477; G01N 21/9505; H01L 22/00
  See application file for complete search history.

(56) References Cited

U.S. PATENT DOCUMENTS

| | | | |
|---|---|---|---|
| 2006/0176548 A1* | 8/2006 | Terada | G01N 21/956 359/368 |
| 2007/0247622 A1 | 10/2007 | Sun | |
| 2009/0324056 A1 | 12/2009 | Sun | |
| 2011/0014725 A1* | 1/2011 | Abiko | H10F 19/908 257/E21.526 |
| 2011/0242312 A1* | 10/2011 | Seki | G01N 21/9505 348/125 |
| 2012/0070065 A1 | 3/2012 | Balak et al. | |
| 2014/0268170 A1* | 9/2014 | Sun | G01N 21/9505 356/498 |

(Continued)

FOREIGN PATENT DOCUMENTS

| | | |
|---|---|---|
| JP | H06-308040 A | 11/1994 |
| JP | H07-198619 A | 8/1995 |

(Continued)

*Primary Examiner* — Jennifer D Bennett
(74) *Attorney, Agent, or Firm* — Posz Law Group, PLC

(57) ABSTRACT

An inspection apparatus includes a light source that generates and emits light to a substrate to be inspected, a lens that captures the light emitted to and reflected by the substrate, a detection unit that detects the light captured by the lens, and a determination unit that calculates a reflectance of light of the substrate based on an intensity of the light generated by the light source and an intensity of the light detected by the detection unit, and performs an abnormality determination of the substrate based on the calculated reflectance.

5 Claims, 7 Drawing Sheets

(56) References Cited

U.S. PATENT DOCUMENTS

2022/0199470 A1\* 6/2022 Yoon ...................... H01L 21/78

FOREIGN PATENT DOCUMENTS

| JP | 2008-096314 A | 4/2008 |
| JP | 2009-032795 A | 2/2009 |
| JP | 2009-099820 A | 5/2009 |
| JP | 2010-219114 A | 9/2010 |
| JP | 2019-160999 A | 9/2019 |

\* cited by examiner

INSPECTION APPARATUS AND INSPECTION METHOD FOR SEMICONDUCTOR SUBSTRATE

CROSS REFERENCE TO RELATED APPLICATIONS

The present application is a continuation application of International Patent Application No. PCT/JP2021/046050 filed on Dec. 14, 2021, which designated the U.S. and claims the benefit of priority from Japanese Patent Application No. 2021-003631 filed on Jan. 13, 2021. The entire disclosures of all of the above applications are incorporated herein by reference.

TECHNICAL FIELD

The present disclosure relates to an inspection apparatus and an inspection method for inspecting a semiconductor substrate.

BACKGROUND

A crystal state inside of a silicon carbide (SiC) substrate or a silicon (Si) substrate used in a semiconductor device can be observed using a visible light or a photoluminescence method. In such an observation method, however, there is a fear of reflection of the back surface of the substrate or an inspection stage. In order to suppress such an issue, a high NA lens having a small depth of focus is used to capture a reflected light from the substrate. NA represents the numerical aperture.

SUMMARY

The present disclosure describes an inspection apparatus and an inspection method for inspecting a semiconductor substrate. The inspection apparatus may emit light to a substrate to be inspected, capture the light emitted to and reflected by the substrate, detect the light captured by the lens, and perform an abnormality determination using a detection result of the light.

BRIEF DESCRIPTION OF DRAWINGS

Features and advantages of the present disclosure will become more apparent from the following detailed description made with reference to the accompanying drawings, in which.

DETAILED DESCRIPTION

Figure 1:
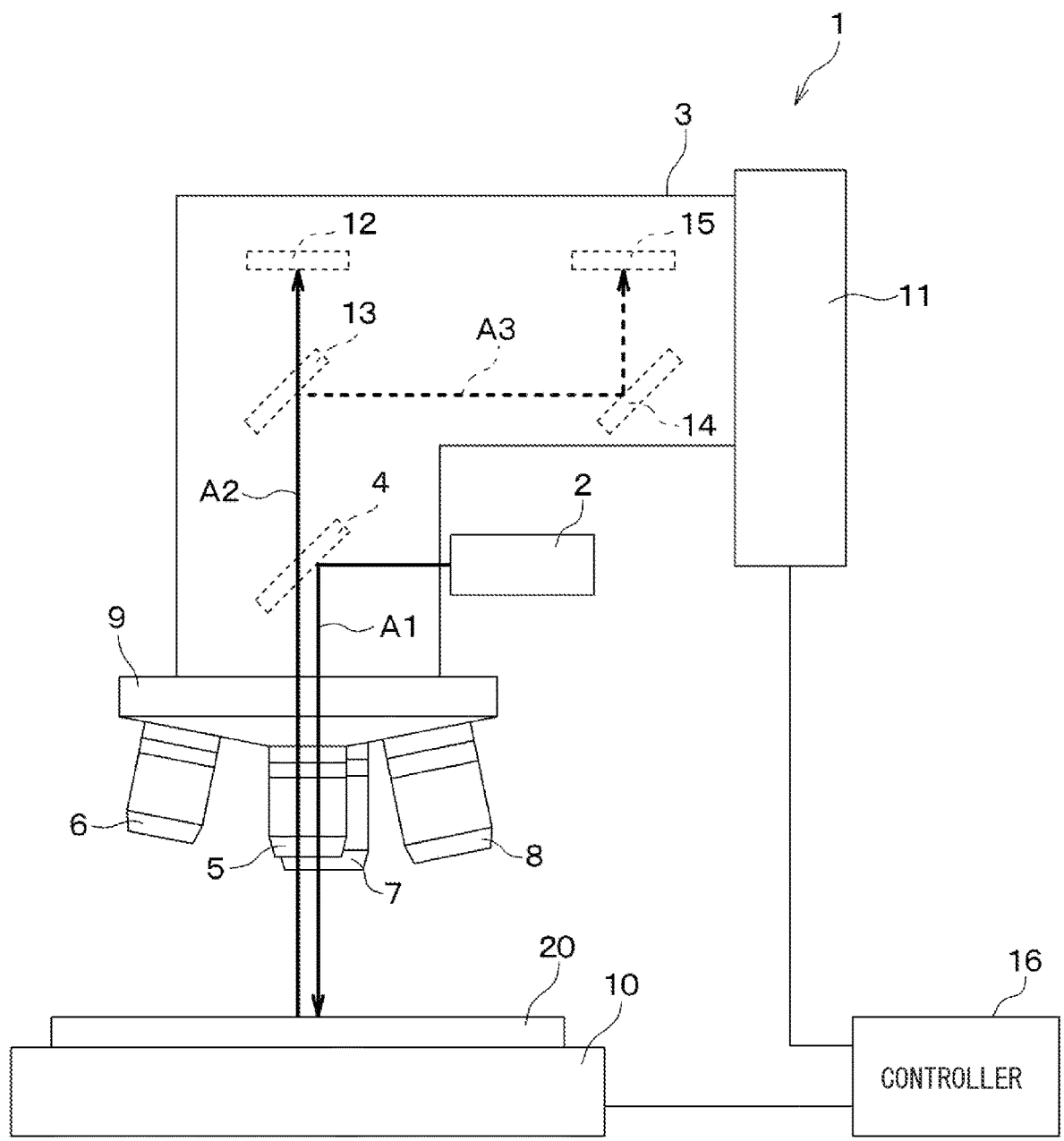
FIG. 1 is a diagram illustrating a configuration of an inspection apparatus for a semiconductor substrate according to a first embodiment.

To begin with, a relevant technology will be described only for understanding the embodiments of the present disclosure.

In regard to the SiC substrate, epitaxial growth for forming the substrate is performed at a high temperature of, for example, about 1600 degrees Celsius (° C.). In this case, carbon inclusions, which is a crystal defect caused by aggregation of carbon, are likely to increase.

When such a substrate is observed with a lens having a small depth of focus, for example, focusing only on the surface of the substrate makes it difficult to distinguish the carbon inclusions from other crystal defects. For this reason, extraction loss of the crystal defects is likely to occur, and the reliability of a semiconductor device produced using such a substrate may be degraded. In addition, even in substrates other than SiC, it is desirable to suppress the extraction loss of crystal defects in order to improve the reliability of the semiconductor device.

After semiconductor elements are formed on a wafer, the wafer is divided into chips by a dicing saw or the like. When the wafer is diced, damage such as a crack may be generated inside the chip. If the damage generated inside the chip progresses into the semiconductor element due to stress caused by a resin sealing or the like performed after the dicing, a malfunction may occur.

Also in this regard, it is desirable to suppress extraction loss of the damage in order to improve the reliability of the semiconductor device. In addition, it is desirable to distinguish and separately detect the crystal defect and the damage due to the dicing in order to identify the process that has caused such a defect and suppress the defect for further improvement of the reliability.

As discussed above, in order to improve the reliability of the semiconductor device, it is important to appropriately grasp the state of the substrate on which the semiconductor element is formed.

The present disclosure provides an inspection apparatus for a semiconductor substrate and an inspection method for a semiconductor substrate, which are, for example, capable of satisfactorily grasping a substrate state.

According to a first aspect of the present disclosure, an inspection apparatus for a semiconductor substrate includes: a light source that generates light and emits the light to a substrate to be inspected; a lens that captures the light emitted to and reflected by the substrate; a detection unit that detects the light captured by the lens; and a determination unit that calculates a reflectance of light of the substrate based on an intensity of the light generated by the light source and an intensity of the light detected by the detection unit, and performs an abnormality determination of the substrate based on the reflectance calculated.

A substrate having a crystal defect or damage such as a crack has a lower reflectance of light than a normal substrate. The way of decrease in the reflectance varies depending on the type of defect. Therefore, in the inspection apparatus according to the first aspect, the type of the defect can be identified by calculating the reflectance in the manner described above, and the state of the substrate can be grasped satisfactorily.

According to a second aspect of the present disclosure, an inspection apparatus for a semiconductor substrate: includes a light source that generates light and emits the light to a substrate to be inspected, a lens that captures the light emitted to the substrate and reflected by the substrate, an adjustment unit that adjusts a distance between the substrate and the lens to a plurality of distances, a detection unit that detects the light captured by the lens for each of the plurality of adjusted distances, and a determination unit that performs an abnormality determination of the substrate based on a detection result of the detection unit for each of the plurality of adjusted distances.

By adjusting the distance between the substrate and the lens to the plurality of distances and detecting the reflected light at each of the distances, it is possible to distinguish a defect, for example, between a defect existing only in a surface layer portion of the substrate and a defect existing over the entire thickness of the substrate. Therefore, in the inspection apparatus according to the second aspect, the state of the substrate can be grasped satisfactorily.

According to a third aspect of the present disclosure, a method for inspecting a semiconductor substrate includes: emitting light to a substrate to be inspected; capturing, by a lens, the light emitted to and reflected by the substrate; detecting the light captured by the lens; calculating a reflectance of light of the substrate based on an intensity of the light emitted to the substrate and an intensity of the detected light; and performing an abnormality determination of the substrate based on the reflectance calculated.

A substrate including a crystal defect or damage such as a crack has a lower reflectance of light than a normal substrate. The way in which the light reflectance decreases varies depending on the type of defect. Therefore, according to the inspection method, by calculating the reflectance of light in the manner described above, it is possible to identify the type of the defect. Accordingly, it is possible to satisfactorily grasp the state of the substrate.

According to a fourth aspect of the present disclosure, a method for inspecting a semiconductor substrate includes: emitting light to a substrate to be inspected, capturing the light emitted to and reflected by the substrate by a lens; adjusting a distance between the substrate and the lens to a plurality of distances; detecting the light captured by the lens for each of the plurality of adjusted distances; and performing an abnormality determination of the substrate based on a detection result for each of the plurality of adjusted distances in the detecting.

By adjusting the distance between the substrate and the lens to the plurality of distances and detecting the reflected light at each of the distances, it is possible to distinguish a defect, for example, between a defect existing only in a surface layer portion of the substrate and a defect existing over the entire thickness in the substrate. Therefore, in the inspection method according to the fourth aspect, it is possible to satisfactorily grasp the state of the substrate.

Embodiments of the present disclosure will be described hereinafter with reference to the drawings. In the embodiments described hereinafter, the same or equivalent parts are denoted by the same reference numerals.

First Embodiment

A first embodiment will be described hereinafter. An inspection apparatus 1 of the present embodiment shown in FIG. 1 is used in a manufacturing process of a semiconductor device for detecting an abnormality such as a crystal defect in a semiconductor substrate before a semiconductor element is formed or in a semiconductor substrate on which the semiconductor element has been formed.

As shown in FIG. 1, the inspection apparatus 1 includes a light source 2, a housing 3, a half mirror 4, a first lens 5, a second lens 6, a third lens 7, a fourth lens 8 and a rotation unit 9. The inspection apparatus 1 further includes a stage 10, a height adjustment unit 11, a first detection unit 12, a movable mirror 13, a mirror 14, a second detection unit 15 and a controller 16.

The light source 2 generates an inspection light and emits the inspection light to a substrate as an object to be inspected. The substrate to be inspected is a wafer 20 shown in FIG. 1 or a substrate 31, which will be described later. In the present embodiment, the inspection light is a visible light, and the light source 2 is, for example, provided by a xenon flash tube. The light source 2 receives a signal from the controller 16. The intensity and the wavelength of the inspection light generated by the light source 2 are set according to the signal received from the controller 16. The light source 2 is arranged on an outer wall of the housing 3, and the inspection light generated from the light source 2 enters inside of the housing 3.

The half mirror 4, the first detection unit 12, the movable mirror 13, the mirror 14, the second detection unit 15 are arranged inside the housing 3. The inspection light emitted from the light source 2 is incident on the half mirror 4.

The half mirror 4 reflects a part of light incident thereon and transmits a remainder of the light incident thereon. The half mirror 4 is arranged so as to reflect the inspection light emitted from the light source 2 and apply the inspection light to the wafer 20. The inspection light reflected by the half mirror 4 is emitted through any of the first lens 5, the second lens 6, the third lens 7 and the fourth lens 8, which are arranged at the lower part of the housing 3, and is applied to the wafer 20 or the substrate 31 placed on the stage 10, as shown by an arrow A1. The inspection light reflected by the wafer 20 or the substrate 31 enters the housing 3 through any of the first lens 5 to the fourth lens 8.

The first lens 5, the second lens 6, the third lens 7 and the fourth lens 8 each capture the inspection light that is emitted to and reflected by the wafer 20 or the substrate 31. The first lens 5 is a lens used for inspecting a defect on the surface of the wafer 20. The first lens 5 has a magnification of 5 times, for example.

The second lens 6 is a lens used for inspecting a defect inside and on the back surface of the wafer 20. The second lens 6 has a numerical aperture smaller than that of the first lens 5, and a depth of focus larger than that of the first lens 5. The second lens 6 has a magnification of 5 times, for example.

The third lens 7 and the fourth lens 8 are lenses used for precisely observing a portion where the defect is found in the inspection using the first lens 5 or the second lens 6, and thus have the magnification higher than those of the first lens 5 and the second lens 6. For example, the third lens 7 has a magnification of 10 or 20 times, and the fourth lens 8 has a magnification of 50 times.

The first to fourth lenses 5 to 8 are attached to the rotation unit 9 disposed at a lower part in the housing 3. The rotation unit 9 is used for setting a lens to be used. The rotation unit 9 is connected to the controller 16 and is driven by an input signal from the controller 16. The first to fourth lenses 5 to 8 are attached to the bottom surface of the rotation unit 9, and any one of the first to fourth lenses 5 to 8 is selected to the lens to be used by rotating the rotation unit 9.

FIG. 1 shows a state in which the first lens 5 is selected as the lens to be used, and the inspection light emitted from the housing 3 through the first lens 5 as indicated by an arrow A1 is reflected by the wafer 20 and enters the housing 3 through the first lens 5 as indicated by an arrow A2. The reflected light captured by the selected lens passes through the half mirror 4 and enters the first detection unit 12 or the movable mirror 13 as indicated by the arrow A2.

The positional relationship between the first to fourth lenses 5 to 8, the wafer 20, and the substrate 31 is adjusted by the stage 10 and the height adjustment unit 11. The stage 10 is for holding a substrate to be inspected. A part of the upper surface of the stage 10 is a flat placement surface on which the substrate to be inspected is placed. FIG. 1 shows a state in which the wafer 20 is placed on the placement surface as the substrate to be inspected. When the semiconductor chip 30 described later is inspected, the substrate 31 of the semiconductor chip 30 is placed on the placement surface in a similar manner.

Two directions parallel to the placement surface of the stage 10 and perpendicular to each other are referred to as an x direction and a y direction, respectively. A height direction, that is, a direction perpendicular to both the x direction and the y direction is referred to as a z direction. The placement surface of the stage 10 is moved in the x direction and the y direction by a linear actuator (not shown) including a stepper motor or the like. The wafer 20 or the substrate 31 placed on the placement surface is moved in the x direction and the y direction by the movement of the placement surface in this manner. Accordingly, the position of the wafer 20 or the substrate 31 in the x direction and the y direction with respect to the first to fourth lenses 5 to 8 are adjusted.

An angle of the placement surface of the stage 10 is changed by a stepper motor (not shown) or the like. By changing the angle of the placement surface, the angle of the wafer 20 or the substrate 31 placed on the placement surface is adjusted. The stage 10 is connected to the controller 16, and the position and angle of the placement surface are set according to an input signal from the controller 16.

The positional relationship between the first to fourth lenses 5 to 8 and the wafer 20 or the substrate 31 in the z direction is adjusted by the height adjustment unit 11. The height adjustment unit 11 is configured to adjust the distance between the first to fourth lenses 5 to 8 and the wafer 20 in a plurality of ways. The height adjustment unit 11 corresponds to an adjustment unit or a distance adjuster. For example, the height adjustment unit 11 is provided by a linear actuator including a stepper motor or the like. The housing 3 is attached to the height adjustment unit 11, and the height of the housing 3 is varied by the driving of the height adjustment unit 11, so that the distances between the first to fourth lenses 5 to 8 and the wafer 20 or the substrate 31 in the z direction are changed. The height adjustment unit 11 is connected to the controller 16, and the distance is set according to an input signal from the controller 16.

The first detection unit 12 detects the reflected light captured by the first lens 5 or the second lens 6. The first detection unit 12 is provided by, for example, a monochrome camera including an image sensor such as a high-sensitivity charge coupled device (CCD), as a first detector. The first detection unit 12 is connected to the controller 16, and transmits the detection result of the reflected light to the controller 16.

The movable mirror 13 can be moved by a driving unit (not shown). When the wafer 20 or the substrate 31 is inspected using the first lens 5 or the second lens 6, the movable mirror 13 is disposed at a position separated from the path of the reflected light, so that the light transmitted through the half mirror 4 enters the first detection unit 12. When the wafer 20 or the substrate 31 is observed in detail using the third lens 7 or the fourth lens 8, the movable mirror 13 is moved to the position shown in FIG. 1 to reflect the light transmitted through the half mirror 4 toward the mirror 14. The light reflected by the movable mirror 13 is reflected by the mirror 14 as indicated by an arrow A3, and is then incident on the second detection unit 15.

The second detection unit 15 detects the light captured by the third lens 7 or the fourth lens 8. The second detection unit 15 is used to observe in detail the portion where a defect is found by the inspection using the first lens 5 or the second lens 6. The second detection unit 15 is provided by, for example, a color camera including an image sensor such as a charge coupled device (CCD), as a second detector. The second detection unit 15 is connected to the controller 16, and the detection result of the reflected light by the second detection unit 15 is transmitted to the controller 16.

The controller 16 operates the light source 2, the stage 10, and the like, and performs an abnormality determination of the wafer 20 or the substrate 31 based on the detection result and the like by the first detection unit 12. Thus, the controller 16 corresponds to a determination unit.

Specifically, as described above, the controller 16 is connected to the height adjustment unit 11. The height adjustment unit 11 is driven by a signal from the controller 16 to adjust the distance between the first lens 5 or the second lens 6 and the wafer 20 to a plurality of distances. The first detection unit 12 detects the light captured by the first lens 5 or the second lens 6 for each of the plurality of adjusted distances. Then, the controller 16 performs the abnormality determination of the wafer 20 based on the detection result of the first detection unit 12 for each of the plurality of adjusted distances.

In an inspection process of the semiconductor chip 30, the controller 16 calculates the reflectance of light of the substrate 31 based on the intensity of the light generated by the light source 2 and the intensity of the light detected by the first detection unit 12, and performs the abnormality determination of the substrate 31 based on the calculated reflectance.

The controller 16 includes a microcomputer having a CPU, ROM, RAM, non-volatile rewritable memory, and the like (not shown). The non-volatile rewritable memory is, for example, electrically erasable and programmable read only memory (EEPROM) or flash ROM. The controller 16 operates the light source 2 and the like to inspect the object to be inspected such as the wafer 20 in accordance with a program stored in the built-in memory.

Figure 2:
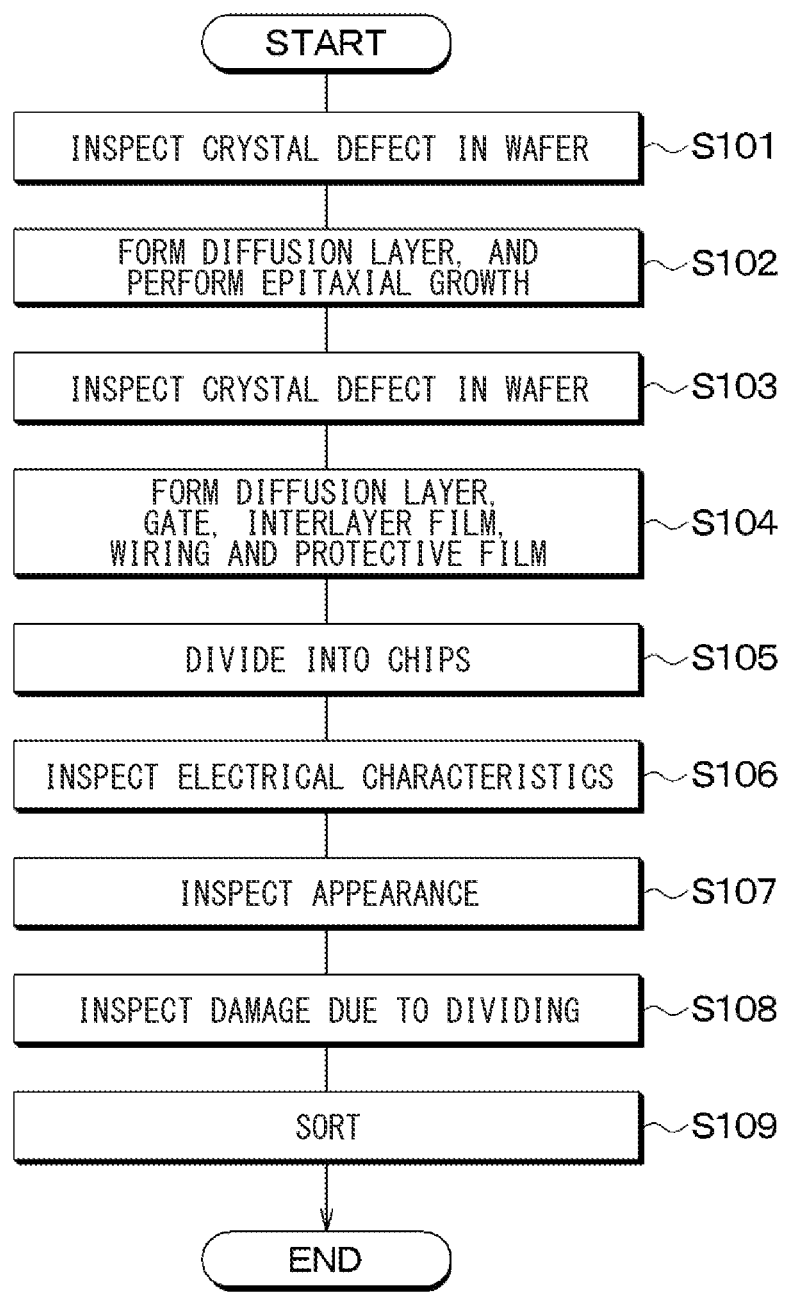
FIG. 2 is a flowchart of a process for manufacturing a semiconductor device.

A method for inspecting a semiconductor substrate using the inspection apparatus 1 will be described. First, a manufacturing process of the semiconductor device will be described. In the manufacturing process of the semiconductor device, processes of S101 to S109 shown in FIG. 2 are sequentially performed. For example, a case where a semiconductor element such as a metal oxide semiconductor field effect transistor (MOSFET) is formed on the wafer 20 will be described.

In S101, a desired number of wafers 20 are assembled into a wafer lot, and a crystal defect of the wafer 20 is inspected. Further, information of the type and position of a defect detected is acquired. Details of the process of S101 will be described later.

In S102, a diffusion layer is formed on the wafer 20. Further, epitaxial growth is performed at a concentration lower than that of the wafer 20 in order to maintain the withstand voltage of the wafer 20. In a trench structure, epitaxial growth at a high concentration is performed to form structures of the semiconductor element.

In S103, similar to S101, the crystal defect of the wafer 20 is inspected, and information of the type and position of the detected defect is acquired. In S103, the inspection is also performed for the layer formed on the wafer 20 by the epitaxial growth in S102.

In S104, a diffusion layer, a gate, an interlayer film, a wiring, a protective film, and the like are formed on the wafer 20. Thus, a plurality of semiconductor elements is formed on the wafer 20.

In S105, the wafer 20 is divided into pieces to produce a plurality of semiconductor chips 30. Specifically, a scribe region is formed between the plurality of semiconductor elements formed on the wafer 20. Thus, in S105, the wafer 20 is diced into chips by applying a dicing saw or the like along the scribe region. As a result, the plurality of semiconductor chips 30 are produced. Details of the semiconductor chip 30 will be described later with reference to FIG. 6.

In S106, electrical characteristics of the semiconductor chip 30 are inspected. In S107, an appearance inspection of the surface of the semiconductor chip 30 is performed. In S108, damages caused to the semiconductor chip 30 due to the dicing is inspected, and the information of the semiconductor chip 30 in which the damage is detected is acquired. Details of S108 will be described later.

In S109, the semiconductor chips 30 are sorted based on the inspection results of S101, S103, S106, S107 and S108. Specifically, the semiconductor chip 30 which has been determined to have an abnormality in any inspection is removed, and the other semiconductor chips 30 are shipped. The shipped semiconductor chips 30 are provided to an assembly process in which a resin sealing process and the like are performed. In this way, since the semiconductor chip 30 in which the abnormality has been detected is removed, an occurrence of defect is suppressed.

Details of S101 and S103 will be described. Pattern roughness may occur on the front surface and the back surface of the wafer 20 due to defocusing during exposure. Further, sublimation due to deterioration of the member may occur during epitaxial growth in S102. Furthermore, the warpage of the wafer 20 may cause gas to flow around and may result in roughening of the back surface. In a case where the wafer 20 is made of SiC, carbon inclusion may occur due to disturbance of the effective C/Si ratio. In addition, a hole defect that penetrates a substrate such as a micro-pipe may occur.

Figure 3:
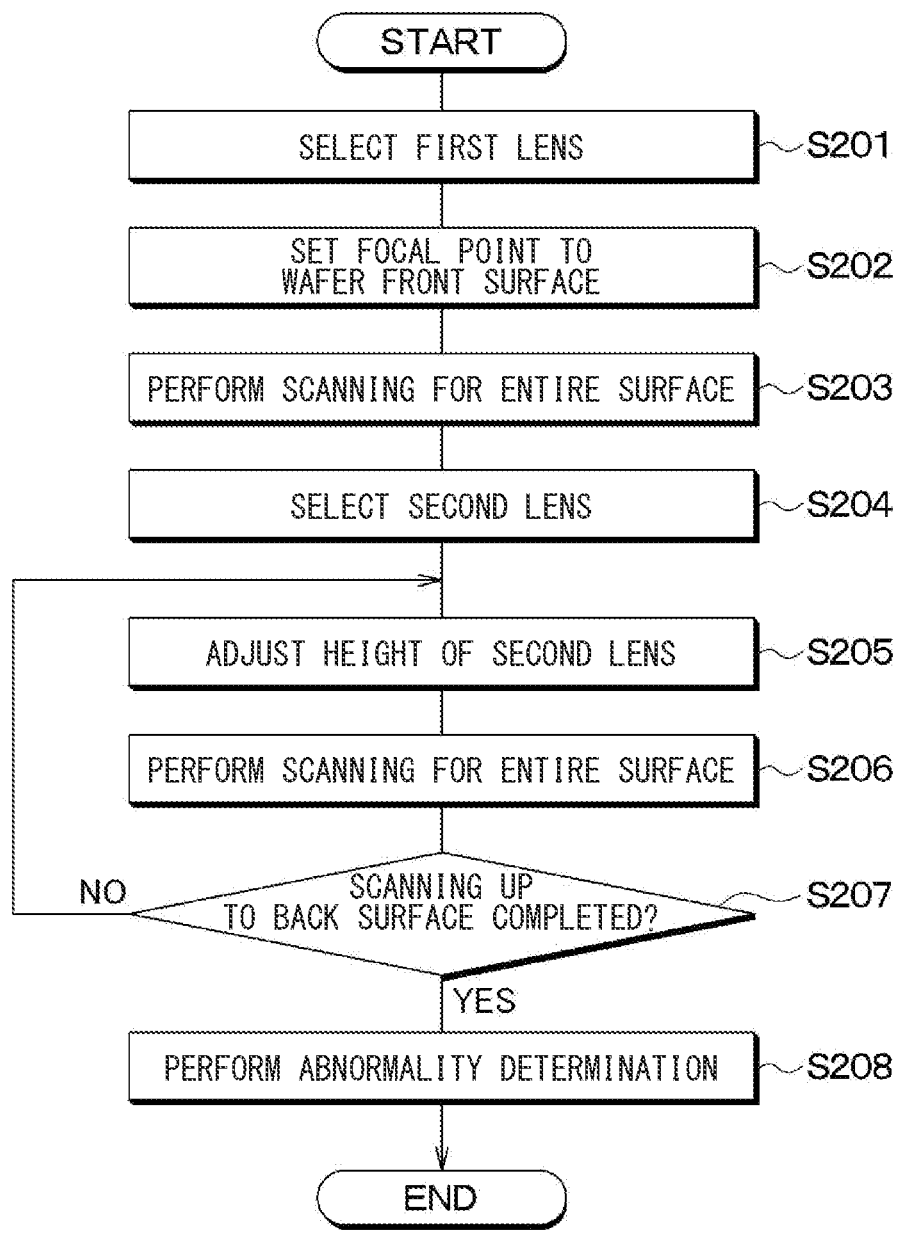
FIG. 3 is a flowchart of a process for inspecting a wafer.

In S101 and S103, the pattern roughness of the front surface and the back surface of the wafer 20 and the internal defects are inspected through the processes of S201 to S208 shown in FIG. 3.

In S201 to S203, the inspection of crystal defect and pattern roughness is performed for the outermost surface of the wafer 20. In S201, the controller 16 operates the rotation unit 9 to set the first lens 5 as the lens to be used. Further, the controller 16 operates a driving unit (not shown) to move the movable mirror 13 to a position separated from the path of the reflected light from the wafer 20.

Figure 4:
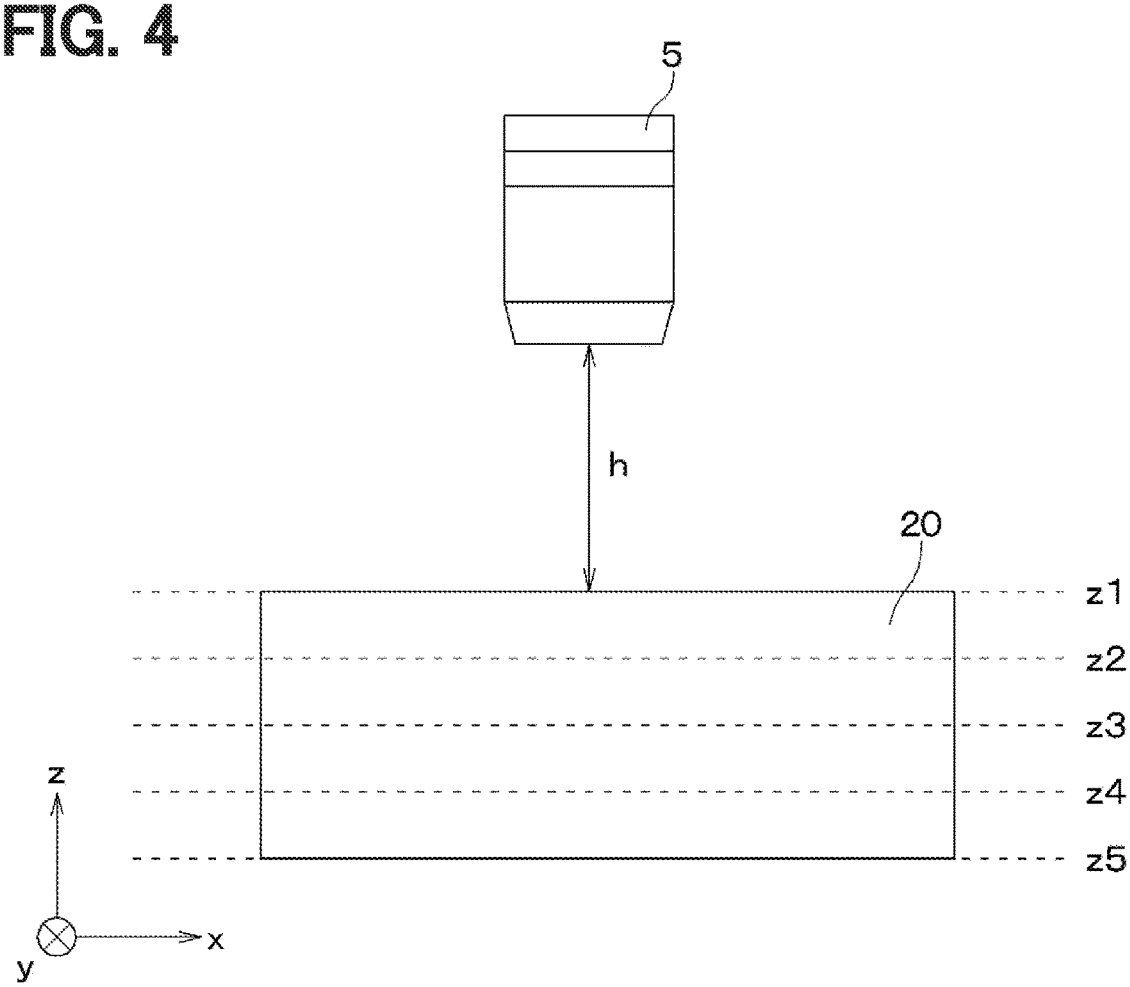
FIG. 4 is a diagram illustrating a positional relationship between a lens and a wafer.

Subsequently, in S202, the controller 16 operates the height adjustment unit 11 to adjust the height of the first lens 5. In this case, as shown in FIG. 4, the height h of the first lens 5 from the surface of the wafer 20 is adjusted so that a focal point of the first lens 5 coincides with the position indicated by z1, that is, the focal point of the first lens 5 is at the height of the front surface of the wafer 20. Accordingly, the inspection light reflected on the front surface of the wafer 20 is favorably captured by the first lens 5.

Subsequently, in S203, the controller 16 causes to scan the entire outermost surface of the wafer 20. Specifically, the controller 16 operates the light source 2 to apply the inspection light to the wafer 20. Also, the controller 16 operates the stage 10 to move the placement surface on which the wafer 20 is placed in the x direction and the y direction, so that the inspection target region of the wafer 20 is moved below the first lens 5. The inspection light reflected by the wafer 20 is captured by the first lens 5 and detected by the first detection unit 12. The controller 16 causes to repeat such movement of the wafer 20 and detection of the reflected light. When the detection of the reflected light is completed entirely in the x direction and the y direction of the wafer 20, the first detection unit 12 transmits the detection result for each position in the x direction and the y direction to the controller 16. Thereafter, the processing proceeds to S204.

In S204 to S207, the inspection for defects inside the wafer 20 and the inspection for pattern roughness on the back surface of the wafer 20 are performed. In S204, the controller 16 operates the rotation unit 9 to set the second lens 6 as the lens to be used. Subsequently, in S205, the controller 16 operates the height adjustment unit 11 to adjust the height of the second lens 6. Specifically, the controller 16 causes to lower the height of the second lens 6.

Subsequently, in S206, the controller 16 causes to perform scanning in a similar manner to S203. That is, the controller 16 operates the stage 10 to move the placement surface on which the wafer 20 is placed in the x direction and the y direction, so that the inspection target region of the wafer 20 is moved below the second lens 6. The inspection light reflected by the wafer 20 is captured by the second lens 6 and detected by the first detection unit 12. The controller 16 causes to repeat such movement of the wafer 20 and detection of the reflected light. When the detection of the reflected light is completed entirely in the x direction and the y direction for the wafer 20, the first detection unit 12 transmits the detection result for each position in the x direction and the y direction to the controller 16. Thereafter, the processing proceeds to S207. In S207, the controller 16 determines whether the scanning has been completed up to the back surface of the wafer 20.

When it is determined that the scanning has not been completed up to the back surface of the wafer 20, the processing proceeds to S205, and the height of the second lens 6 is further lowered. Specifically, in S205 of the first time, the height of the second lens 6 is adjusted so that the focal point of the second lens 6 coincides with the position indicated by z2 in FIG. 4. In S205 of the second time, the height of the second lens 6 is adjusted so that the focal point of the second lens 6 coincides with the position indicated by z3. In S205 of the third time, the height of the second lens 6 is adjusted so that the focal point of the second lens 6 coincides with the position indicated by z4. Then, in S205 of the fourth time, the height of the second lens 6 is adjusted so that the focal point of the second lens 6 coincides with the position indicated by z5, that is, the height of the back surface of the wafer 20. When the process of S206 is completed in a state in which the focal point is adjusted at the position indicated by z5, it is determined that the scanning has been completed up to the back surface of the wafer 20.

As described above, for the inspection inside of the wafer 20, the position of the second lens 6 in the z direction is adjusted to three levels, and the entire surface scanning of the wafer 20 in the x direction and the y direction is performed at each of the levels in the z direction. When it is determined that the scanning is completed up to the back surface of the wafer 20, the processing proceeds to S208.

In S208, the controller 16 performs an abnormality determination for the wafer 20 based on the detection results for the respective positions z1 to z5 transmitted from the first detection unit 12 in S203 and S206. That is, the controller 16 performs the abnormality determination of the wafer 20 based on the detection result of the light captured by the first lens 5 and the detection result of the light captured by the second lens 6. Specifically, an image of the wafer 20 captured by the first detection unit 12 is transmitted to the controller 16, and the controller 16 analyzes the image to determine whether or not there is an abnormality such as a pattern roughness or a crystal defect.

Figure 5:
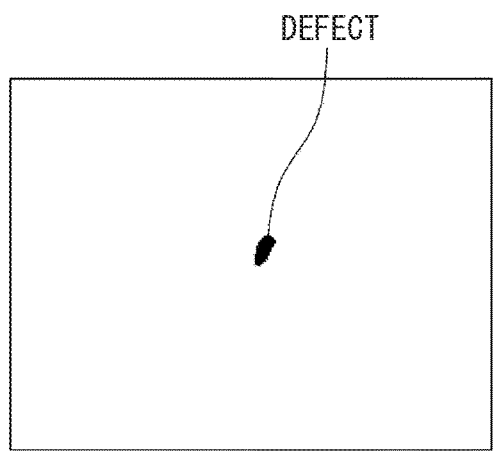
FIG. 5 is a diagram illustrating an example of a detection result of reflected light.

For example, an image as illustrated in FIG. 5 is transmitted to the controller 16. In FIG. 5, the horizontal direction and the vertical direction correspond to the x direction and the y direction, respectively. When a black portion is present in the image as illustrated in FIG. 5, it is determined that an abnormality such as a defect is present in the portion. When a defect or the like is detected in any of the positions z1 to z5, the controller 16 stores the position in the x and y directions of the portion of the wafer 20 including the defect. When there is no black portion in the image, it is determined that there is no abnormality such as a defect at the position in the x and y directions.

Further, in the present embodiment, the controller 16 identifies the type of the crystal defect by integrating the inspection results of the front surface and the inside. For example, when the defect is imaged at all the positions z1 to z4 of the wafer 20 as illustrated in FIG. 5, it is determined that a carbon inclusion extending from the front surface to the inside of the wafer 20 is present at the position in the x and y directions.

A detailed observation using the third lens 7 or the fourth lens 8 is performed for the portion of the wafer 20 determined to have an abnormality. In this observation, the controller 16 operates the driving unit (not shown) to move the movable mirror 13 to the position shown in FIG. 1. Accordingly, the reflected light enters the second detection unit 15. Then, a detailed image of the wafer 20 is captured by the second detection unit 15 and transmitted to the controller 16. After S208, the processing is ended.

As described above, in S101 and S103, the controller 16 performs the inspections for the pattern roughness on the front surface of the wafer 20, the internal crystal defect, and the pattern roughness on the back surface of the wafer 20, and grasps the position of an abnormality in the wafer 20.

Of the processes of S101 and S103, only the process of S101 may be performed. However, if the inspection is performed during the element forming process as in S103, it is possible to specify a process in which defects frequently occur. As a result, it is possible to reduce foreign matter and to reduce pattern collapse due to defocusing during exposure. Thus, the quality of the wafer 20 can be improved. Alternatively, of the processes of S101 and S103, only the process of 103 may be performed.

In the inspection processing illustrated in FIG. 3, the wavelength of the inspection light generated by the light source 2 is set according to the signal input from the controller 16 to the light source 2, and thus the light having a wavelength that is not absorbed by the wafer 20 is used as the inspection light. For example, when the wafer 20 is made of silicon carbide (SiC), the light having a wavelength of 500 nm or more and 800 nm or less is applied to the wafer 20. When the wafer 20 is made of silicon (Si), the light having a wavelength of 1100 nm or more and 1200 nm or less is applied to the wafer 20. When the wafer 20 is made of carbon (C), the light having a wavelength of 300 nm or more and 600 nm or less is applied to the wafer 20.

Figure 6:
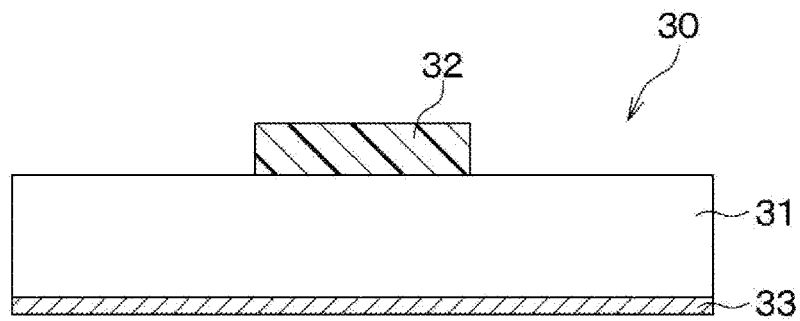
FIG. 6 is a diagram illustrating a schematic cross-sectional view of a semiconductor chip.

Details of S108 will be described. Here, a case where a semiconductor chip 30 shown in FIG. 6 is inspected will be described. As shown in FIG. 6, the semiconductor chip 30 includes a substrate 31, a polyimide film 32, and an electrode 33. The substrate 31 is formed from the wafer 20 by dividing the wafer 20 into a rectangular shape. The polyimide film 32 is a protective film formed in the process of S104 in FIG. 2. The polyimide film 32 is formed on the front surface side of the substrate 31 so as to cover a wiring layer or the like (not shown). The electrode 33 is formed in the process of S104 and covers the entire back surface of the substrate 31.

In S105 of FIG. 2, damage such as a crack or chipping may occur on the dicing line. In S109, if a semiconductor chip in which such damage has occurred is shipped and provided to the assembly process of performing resin sealing or the like, there is a possibility that the damage progresses due to thermal stress or the like in the resin sealing, which will result in the breakage and malfunction of the semiconductor element. In order to suppress such destruction of the semiconductor element, damage such as a crack is detected in S108, and the semiconductor chip in which the damage has been detected is removed in S109.

Figure 7:
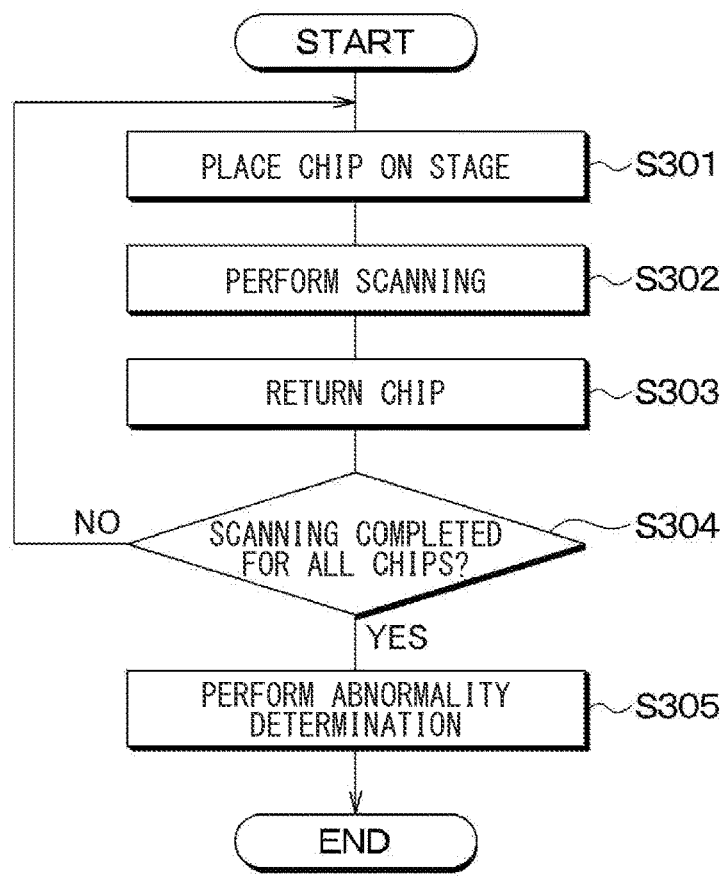
FIG. 7 is a flowchart of a process for inspecting a semiconductor chip.

In S108, the controller 16 causes the inspection of the substrate 31 through the processes of S301 to S305 shown in FIG. 7. First, in S301, the controller 16 operates a conveyance device (not shown) to pick up one of the plurality of semiconductor chips 30 stored in a chip tray (not shown) and place the semiconductor chip on the stage 10. Then, the controller 16 operates the stage 10 to adjust the angle of the placement surface so as to set the semiconductor chip 30 to be parallel. The controller 16 operates the rotation unit 9 to set the first lens 5 or the second lens 6 as the lens to be used. Further, the controller 16 operates a driving unit (not shown) to move the movable mirror 13 to a position separated from the path of the reflected light from the semiconductor chip 30.

Figure 8:
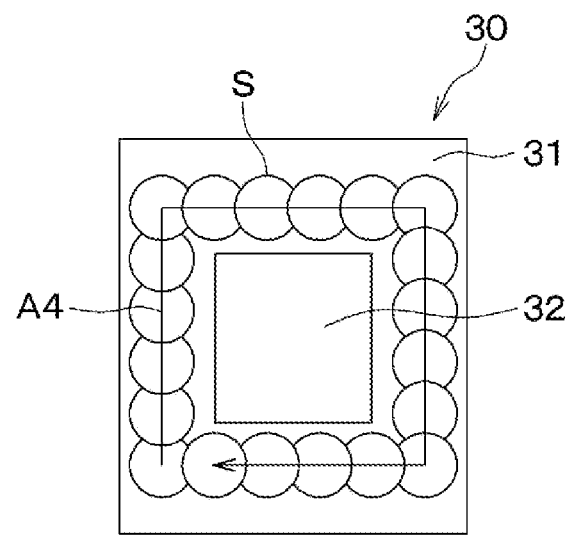
FIG. 8 is a diagram illustrating a top view of a semiconductor chip, with a scanning path of an inspection light.

Subsequently, in S302, the controller 16 operates the light source 2 to emit the inspection light to the substrate 31. The inspection light is reflected by the substrate 31 and captured by the lens set in S301. The controller 16 operates the stage 10 to move the substrate 31 in the x direction and the y direction and causes to scan the substrate 31 with the inspection light as shown in FIG. 8, while causing the first detection unit 12 to detect the intensity of the reflected light captured by the lens. In FIG. 8, an arrow A4 indicates a scanning path of the inspection light. In S302, the first lens 5 or the second lens 6 is used.

The inspection light is applied to a region between the semiconductor element and the end portion of the chip from the upper surface side of the substrate 31. For example, the inspection light is applied to a position between the polyimide film 32, which is an upper layer film of the semiconductor element, and the dicing line, which is at the end portion of the substrate 31, the position being separate by several tens of micrometers from the end portion of the substrate 31. Then, the controller 16 causes to perform the scanning for the four sides of the outer peripheral portion of the substrate 31 with the inspection light so as to go around the polyimide film 32 with a corner portion of the substrate 31 as the irradiation start point, and to end the scanning when returning to the irradiation start point after one round.

The diameter of the irradiation spot S of the inspection light is, for example, 25 μm, but may be reduced to about 10 μm in some cases. In addition, the scanning step of the inspection light, that is, the distance between the centers of two adjacent irradiation spots S is, for example, 10 μm, but may be changed in a range from 1 μm to 20 μm in some cases.

Subsequently, in S303, the controller 16 operates a conveyance device (not shown) to return the semiconductor chip 30 on the stage 10 to a chip tray (not shown). Subsequently, in S304, the controller 16 determines whether or not the scanning process of S302 has been completed for all the semiconductor chips 30 stored in the chip tray (not shown).

When it is determined that the scanning process has not been completed for all the semiconductor chips 30, the processing proceeds to S301. Thus, one semiconductor chip 30 for which the scanning process has not been completed is picked up from the plurality of semiconductor chips 30 stored in the chip tray (not shown) and placed on the stage 10. When it is determined that the scanning process has been completed for all the semiconductor chips 30, the processing proceeds to S305.

Figure 9:
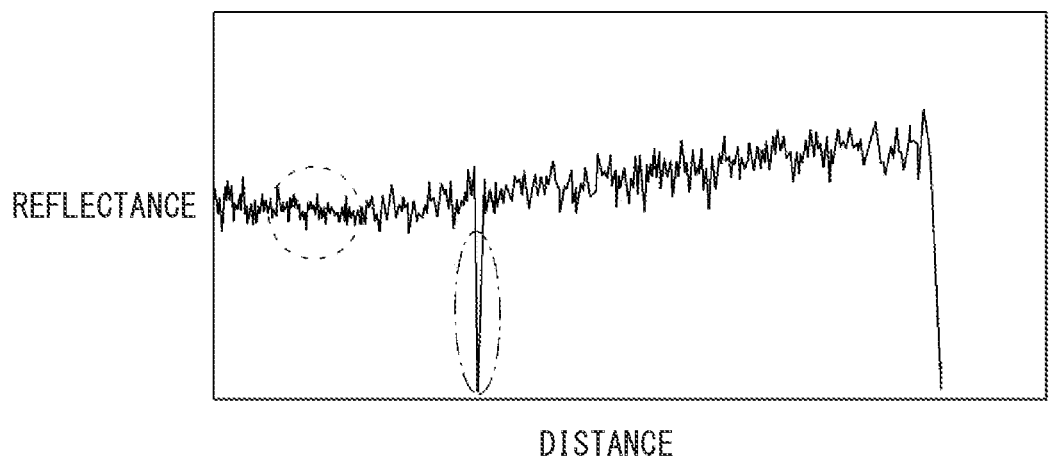
FIG. 9 is a graph illustrating a calculation result of reflectance.

In S305, the controller 16 performs an abnormality determination for each semiconductor chip 30. Specifically, for each semiconductor chip 30, the controller 16 calculates the reflectance of light of the substrate 31 based on the intensity of the light generated by the light source 2 in S302 and the intensity of the reflected light detected by the first detection unit 12. Then, the controller 16 performs the abnormality determination of the substrate 31 based on the calculated reflectance. The reflectance is as shown in FIG. 9, for example. The horizontal axis of FIG. 9 represents the distance scanned with the inspection light. In this case, the calculation result of the reflectance of the scanning for one side of one semiconductor chip 30 is illustrated.

Figure 10:
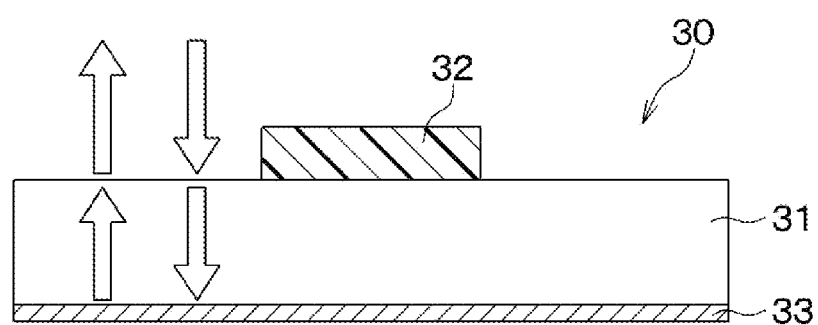
FIG. 10 is a diagram illustrating a cross-sectional view of a semiconductor chip, with a path of inspection light emitted to the semiconductor chip.

A part of the inspection light is reflected by the surface of the substrate 31 and travels upward from the substrate 31, whereas the remaining part of the inspection light travels inside the substrate 31 and is reflected by the electrode 33, passes through the inside of the substrate 31, and is then emitted upward from the surface of the substrate 31. As shown by white arrows in FIG. 10, in a normal portion in which the substrate 31 is not damaged, the inspection light travels straight without being scattered much, and thus the intensity of the reflected light detected is substantially constant at a high value. Accordingly, the calculated reflectance is substantially constant at a high value.

Figure 11:
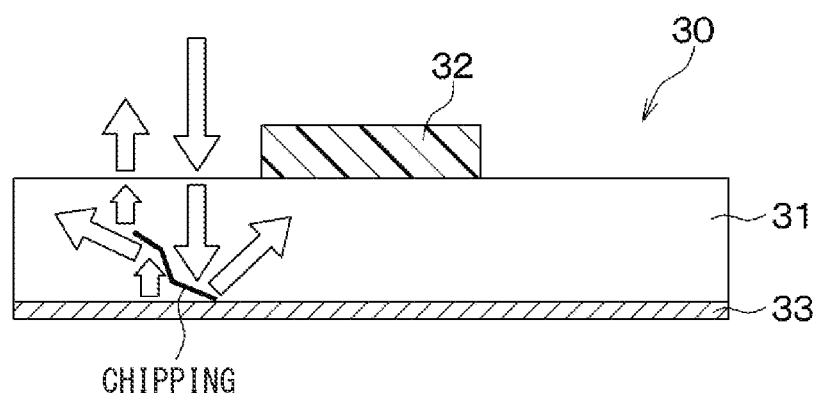
FIG. 11 is a diagram illustrating a cross-sectional view of a semiconductor chip in which chipping has occurred, for showing a state in which an inspection light is scattered in the semiconductor chip.

On the other hand, in an abnormal portion having damage such as a crack or chipping, as indicated by white arrows in FIG. 11, the inspection light is scattered due to the damage inside the substrate 31, and thus the intensity of light emitted upward from the surface of the substrate 31 decreases. As a result, the calculated reflectance is lower than that of the normal portion.

As such, the damage can be detected based on the decrease in reflectance. For example, a part surrounded by a broken line in FIG. 9 corresponds to the normal portion, and the reflectance is substantially constant at a high value. On the other hand, a part surrounded by an alternate long and short dash line corresponds to the abnormal portion where the damage has occurred, and the reflectance is greatly reduced as compared with the portion corresponding to the normal portion. When the decrease in reflectance is detected in this manner, the controller 16 determines that there is an abnormality in the corresponding semiconductor chip 30.

On the other hand, when the reflectance is high and substantially constant over the entirety of the semiconductor chip 30, the controller 16 determines that there is no abnormality in the corresponding semiconductor chip 30.

The decrease in reflectance is detected, for example, by comparing the calculated reflectance with a predetermined threshold value. This threshold value is determined from the correlation between the stress applied to the semiconductor chip 30 after the resin sealing and the destruction of the element.

The way of decrease in the reflectance varies depending on the type of defect. For example, FIG. 9 illustrates a decrease in reflectance due to chipping. However, when there is another damage, the reflectance decreases in a manner different from the graph illustrated in FIG. 9. In addition, the reflectance also decreases when there is a crystal defect in the substrate. In this case, however, the reflectance decreases in a manner different from that of the case of the damage such as chipping. Specifically, the reflectance decreases both in the case where there is a damage and in the case where there is a crystal defect. However, in the case where there is a damage, the reflectance further decreases and becomes almost zero. When detecting the decrease in the reflectance, the controller 16 further determines the type of the defect from the decrease in the reflectance. For example, assumed that a standard deviation of the reflectance of a normal substrate is defined as a. When the controller 16 detects a decrease in the reflectance and when the reflectance deviates from the value of $3a$, the controller 16 determines that a damage such as chipping is present.

The semiconductor chip 30 that has been determined to have an abnormality is observed in detail using the third lens 7 or the fourth lens 8. In this observation, the movable mirror 13 is moved to the position shown in FIG. 1, so that the reflected light enters the second detection unit 15. Then, the detailed image of the semiconductor chip 30 is captured by the second detection unit 15 and transmitted to the controller 16. When the abnormality determination is completed for all the semiconductor chips 30, the controller 16 ends the processing.

In the processing of FIG. 7, similar to the processing shown in FIG. 3, the light having a wavelength that is not absorbed by the substrate 31 is used as the inspection light. That is, when the substrate 31 is made of SiC, the light having a wavelength of 500 nm or more and 800 nm or less is applied to the substrate 31. When the substrate 31 is made of Si, the light having a wavelength of 1100 nm or more and 1200 nm or less is applied to the substrate 31. When the substrate 31 is made of C, the light having a wavelength of 300 nm or more and 600 nm or less is applied to the substrate 31.

As described above, in the present embodiment, the inspection light is applied to the semiconductor chip 30, and the abnormality determination is performed based on the reflectance of the inspection light. In a substrate having a damage such as a crack, the reflectance of light is lower than that of a normal substrate. The way of decrease in the reflectance varies depending on the type of defect. Therefore, by calculating the reflectance as described above, the type of defect can be identified, and the crystal state can be grasped satisfactorily.

According to the embodiment described above, it is possible to achieve the following advantageous effects.

(1) The distance between the second lens 6 and the wafer 20 is adjusted to the plurality of distances, and the abnormality determination of the wafer 20 is performed based on the detection result of the first detection unit 12 for each of the plurality of adjusted distances. By integrating the plurality of detection results, it is possible to distinguish defects, such as a defect existing only on the surface layer portion of the wafer 20 and a defect existing inside the wafer 20 over the entire thickness, from each other. As a result, the crystal state can be more favorably grasped.

(2) The reflected light from the front surface of the wafer 20 is captured by the first lens 5, and the reflected light from the inside and the back surface of the wafer 20 is captured by the second lens 6, which has a greater depth of focus than that of the first lens 5. Accordingly, in the inspection for a defect on the front surface of the wafer 20, reflection of the back surface of the wafer 20 and the stage 10 can be suppressed. In addition, defects in the inside and on the back surface of the wafer 20 can be detected. As such, the accuracy of identification of the type of defect is improved.

(3) The light having a wavelength that is not absorbed by the substrate to be inspected is used as the inspection light. Accordingly, it is possible to satisfactorily capture the defect, and the accuracy of the abnormality determination is thus improved.

OTHER EMBODIMENTS

The present disclosure is not limited to the embodiment described above, and can be appropriately modified. Individual components or features of the embodiment described above are not necessarily essential unless it is specifically stated that the components or the features are essential in the foregoing description, or unless the components or the features are obviously essential in principle. The numerical value such as the number, the quantity, the range, or the like of components mentioned in the embodiment described above is not limited to a specific number unless specified as being required, clearly limited to such a specific number in principle, or the like.

For example, in the first embodiment, a visible light is used as the inspection light. Alternatively, an invisible light may be used as the inspection light. For example, infrared light may be used as the inspection light. By performing both the inspection processing shown in FIG. 3 and the inspection processing shown in FIG. 7, the state of the substrate can be further favorably grasped. However, only one of these inspection processing may be performed.

In the first embodiment described above, the distance between the first lens 5 or the second lens 6 and the wafer 20 is adjusted by the height adjustment unit 11. Alternatively, the distance may be adjusted to the plurality of distances by moving the placement surface of the stage 10 in the z direction. For example, the placement surface can be moved in the z direction by a linear actuator including a stepper motor or the like. When the distance is adjusted to the plurality of distances by the stage 10 as described above, the stage 10 corresponds to an adjustment unit or a distance adjuster.

In the first embodiment described above, the heights of the first lens 5 or the second lens 6 are adjusted in five ways, that is, to the five levels. However, the heights may be adjusted in two, three or four ways, or may be adjusted in six or more ways. That is, the height of the second lens 6 may be adjusted in one to three ways, or may be adjusted in five or more ways.

In the first embodiment described above, the first lens 5 or the second lens 6 is selectively used depending on the position of the wafer 20 to be inspected. However, the inspection of the wafer 20 from the front surface to the back surface may be performed by using one lens. For example, when the wafer 20 is inspected from the front surface to the back surface using the first lens 5, the range in which the reflected light can be clearly captured is narrowed. However, by integrating the inspection results at a plurality of positions, the type of the defect can be identified with a certain degree of accuracy.

Further, after removing the semiconductor chip 30 having an abnormality based on the results of S101 and S103, the processes of S106 to S109 may be performed only for the other semiconductor chips 30. Alternatively, the processes of S106 to S109 may be performed for all the semiconductor chips 30. When the process of S106 and the like are performed for all of the semiconductor chips 30, it is possible to identify whether the abnormality of the substrate 31 is a crystal defect present in the wafer 20 or a damage due to dicing, based on the way of the decrease in the reflectance.

The controller and the technique according to the present disclosure may be achieved by a dedicated computer provided by constituting a processor and a memory programmed to execute one or more functions embodied by a computer program. Alternatively, the controller and the method described in the present disclosure may be implemented by a special purpose computer configured as a processor with one or more special purpose hardware logic circuits. Alternatively, the controller and the method described in the present disclosure may be implemented by one or more special purpose computer, which is configured as a combination of a processor and a memory, which are programmed to perform one or more functions, and a processor which is configured with one or more hardware logic circuits. The computer programs may be stored, as instructions to be executed by a computer, in a tangible non-transitory computer-readable medium.

While the present disclosure has been described with reference to embodiments thereof, it is to be understood that the disclosure is not limited to the embodiments and constructions. The present disclosure is intended to cover various modification and equivalent arrangements. In addition, while the various combinations and configurations, other combinations, and configurations, including more, less or only a single element, are also within the spirit and scope of the present disclosure.

What is claimed is:

1. An inspection apparatus for a semiconductor substrate, the inspection apparatus comprising:
   a light source configured to generate light and emit the light to a substrate to be inspected;
   a lens configured to capture the light emitted to and reflected by the substrate;
   an adjustment unit configured to adjust a distance between the substrate and the lens to a plurality of distances, as a plurality of adjusted distances;
   a detection unit configured to detect the light captured by the lens for each of the plurality of adjusted distances; and
   a determination unit configured to perform an abnormality determination of the substrate based on an integrated detection result obtained at the plurality of adjusted distances by the detection unit, wherein:
   the lens includes a first lens and a second lens that has a depth of focus larger than that of the first lens, and
   the determination unit is configured to determine a type of defect based on the integrated detection result that includes
   a first detection result obtained by the detection unit when the first lens is adjusted by the adjustment unit to have a focal point at a front surface of the substrate, and the front surface of the substrate is entirely scanned by the first lens along a planar direction of the substrate, a plurality of second detection results obtained by the detection unit when the second lens is adjusted by the adjustment unit to have focal points at a plurality of depth positions of the substrate between the front surface and a back surface, and an inside of the substrate is entirely scanned by the second lens at each of the plurality of depth positions along the planar direction, and a third detection result obtained by the detection unit when the second lens is adjusted by the adjustment unit to have a focal point at the back surface, and the back surface of the substrate is entirely scanned by the second lens along the planar direction.

2. A method for inspecting a semiconductor substrate, the method comprising:

emitting light to a substrate to be inspected;

capturing the light emitted to and reflected by the substrate by a lens;

adjusting a distance between the substrate and the lens to a plurality of distances, as a plurality of adjusted distances;

scanning the substrate entirely along a planar direction by the lens while keeping the lens at each of the plurality of adjusted distances;

detecting the light captured by the lens for each of the plurality of adjusted distances; and performing an abnormality determination of the substrate based on an integrated detection result obtained by integrating detection results obtained by the detecting at the plurality of adjusted distances, wherein:

the lens includes a first lens and a second lens that has a depth of focus larger than that of the first lens, the adjusting the distance includes
adjusting a distance between the substrate and the first lens to a front surface distance at which the first lens has a focal point at a front surface of the substrate,
sequentially adjusting a distance between the substrate and the second lens to a plurality of internal distances including a first distance at which the second lens has a focal point at a first depth position between the front surface and a back surface inside the substrate and a second distance at which the second lens has a focal point at a second depth position deeper than the first depth position and between the front surface and the back surface inside the substrate, and
adjusting the distance between the substrate and the second lens to a back surface distance at which the second lens has the focal point at the back surface, the detecting the light includes detecting
the light captured by the first lens when the substrate is scanned entirely along the planar direction by the first lens adjusted to the front surface distance,
the light captured by the second lens when the substrate is scanned entirely along the planar direction by the second lens adjusted to each of the plurality of internal distances, and
the light captured by the second lens when the substrate is scanned entirely along the planar direction by the second lens adjusted to the back surface distance, and the performing the abnormality determination includes determining a type of a defect based on the integrated detection result, including
a detection result obtained when the first lens is at the front surface distance, and
detection results obtained when the second lens is at the back surface distance and at each of the plurality of internal distances.

3. The method according to claim 2, wherein
the substrate is made of silicon carbide, and
the emitting includes generating the light having a wavelength of 500 nm or more and 800 nm or less.

4. The method according to claim 2, wherein
the substrate is made of silicon, and
the emitting includes generating the light having a wavelength of 1100 nm or more and 1200 nm or less.

5. The method according to claim 2, wherein
the substrate is made of carbon, and
the emitting includes generating the light having a wavelength of 300 nm or more and 600 nm or less.

* * * * *